Figure 1:
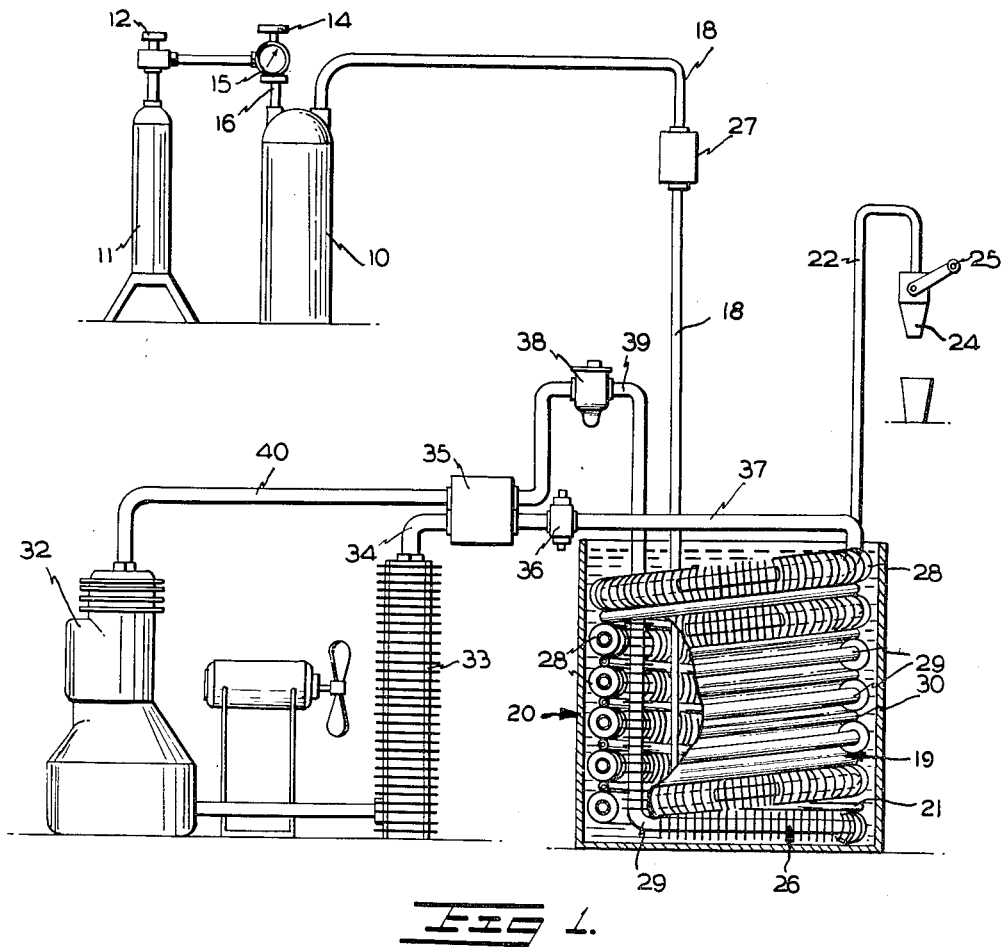

July 3, 1956  O. J. SHEPARD  2,752,763
BEVERAGE COOLING APPARATUS
Filed April 5, 1954

INVENTOR
ORLANDO J. SHEPARD

BY Bosworth, Sessions,
Henstrom & Williams
ATTORNEY

United States Patent Office 2,752,763
Patented July 3, 1956

2,752,763

BEVERAGE COOLING APPARATUS

Orlando J. Shepard, Muskegon, Mich., assignor to Glascock Brothers Manufacturing Co., Muncie, Ind., a corporation of Indiana Application April 5, 1954, Serial No. 420,912

9 Claims. (Cl. 62—141)

This invention relates in general to a method and apparatus for cooling and dispensing liquids, and in particular to cooling and dispensing beverages. The invention is described herein with particular reference to the cooling and dispensing of non-alcoholic carbonated beverages of the "pre-mix" type. Pre-mix beverages are supplied in tanks with the flavoring syrup and carbonated water already mixed in correct proportions, as distinguished from beverages in which carbonated water and a flavoring syrup are mixed together just as they are being delivered to the cup. It is to be understood, however, that the invention may be useful in the dispensing of liquids of other types.

Dispensers for soft drinks are commonly found in theater lobbies, cafeterias and other public places where they are subjected to comparatively short periods of peak demand and intermediate, longer periods of comparative idleness. For example, in coin-controlled beverage vending machines installed in factories there are periods of peak demand when the work shifts are changing and during rest periods provided in the shifts. This type of operation is also experienced in theaters and other places of public amusement where the demand reaches peaks during intermissions and before and after performances. Heretofore, mechanical refrigeration systems used with soft drink dispensing machines have been equipped with flash type coolers employing aluminum heat exchangers. Because of the high peak load requirements, these machines have required relatively large refrigeration capacity. For example, taking a dispensing rate of four 6-ounce drinks per minute as a peak rate, to be cooled from 80° F. to 40° F., presently employed flash cooling equipment requires a compressor of at least ½ H. P. The large compressor is required only during the comparatively short periods of demand; during the major portion of the day the compressor capacity is greatly in excess of what is required. Even with the use of large and expensive compressors prior drink dispensers embodying flash type heat exchangers have left much to be desired in so far as their ability to deliver drinks at constantly low temperature is concerned.

Accordingly, a general object of the present invention is to provide a method and apparatus for cooling beverages down to a desired dispensing temperature and having the ability to meet the requirements of periods of peak demand with substantially less refrigeration capacity than required by prior apparatus. Another object of the invention is the provision of a method and apparatus for cooling and dispensing drinks that functions to deliver drinks at desirably low temperatures. Another object is the provision of such an apparatus embodying a small refrigeration unit that operates to store up cooling capacity in the system between periods of peak demand. Another object is the provision of an apparatus particularly adapted for cooling and dispensing pre-mixed carbonated beverages such as beverages of the "cola" type. Another object is to provide an apparatus for cooling beverages in which a reservoir of cooling capacity is established during inactive periods by means of a liquid having a freezing point higher than the freezing point of the beverage to be dispensed and below the temperature at which the beverage is usually dispensed so that the latent heat of fusion of the liquid can be utilized to cool the beverage. Other objects include the provision of pre-mix dispensing units of less cost than present such units; the provision of pre-mix dispensing units that are more compact and more efficient than prior units and the provision of pre-mix dispensing units that can be used not only for coin-controlled machines but in manually operated dispensing machines designed for use in barbecue stands, soda fountains and the like.

In so far as the dispensing of ordinary carbonated beverages is concerned, the present invention depends for its operation upon the fact that in the usual type of pre-mix beverage the amount of sugar present in the beverage and the amount of carbonation are such that the freezing temperature of the beverage is several degrees below that of water. Accordingly, the invention contemplates the immersion of the evaporator coil of the refrigerator system and a cooling coil for the beverage in a water bath, the refrigeration system being utilized to freeze the water into ice during periods of comparatively low demand; the stored cooling capacity of the frozen water bath is sufficient to meet the requirements of periods of peak demand even though the cooling capacity of the refrigeration system would be greatly deficient for such periods. Thus a relatively small compressor running a greater percentage of time is employed rather than a large compressor that is used only during periods of peak demand. The ice bath acts as a reservoir of refrigeration capacity just as a fly wheel in a mechanical system acts as a reservoir of energy; in both cases the reservoirs are drawn on to meet the peak demands and smaller motors are able to supply the required power. As a matter of actual experience it has been found that with the device of the present invention it is possible to cool one hundred 6-ounce drinks from 80° F. to below 40° F. at the rate of four drinks per minute with a ⅛ H. P. compressor whereas, as noted above, this rate of cooling ordinarily requires a ½ H. P. compressor when an aluminum flash cooler is employed. This reduction in the size of the compressor is important not only from the standpoint of cost of the compressor itself but also from the standpoint of compactness and cost of the entire apparatus.

Figure 2:
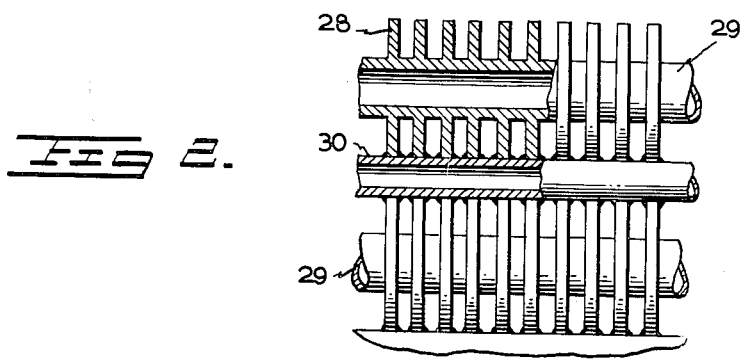

Referring now to the drawings, Figure 1 is a schematic illustration of a preferred embodiment of the invention showing the main element in one of several possible arrangements; and Figure 2 is a fragmentary partial section of a preferred arrangement of the refrigerating and beverage cooling coils.

As shown in Figure 1, a preferred form of apparatus embodying the invention comprises a beverage storage tank 10 alongside of which is a carbon dioxide tank 11. The carbon dioxide tank is connected to the beverage storage tank in a conventional manner by means of shut off valve 12, pressure reducing valve 14, pressure gage 15 and pipe line 16. Beverage from tank 10 is fed by the pressure of the carbon dioxide through conduit 18 to a beverage cooling coil 19 disposed within the water bath vat 20. The beverage cooling coil 19 is in the form of a helical coil extending upwardly from the bottom to the top of the water bath vat. The lower end 21 of the coil is connected to the conduit 18 and the upper end of the coil to the discharge conduit 22. The discharge conduit 22 leads to dispensing valve 24 which may be operated by a solenoid (not shown), for example, in a coin-controlled vending machine, or by a handle 25 in a machine designed for manual operation. In either event, while any suitable type of faucet may be employed, it is preferred that a faucet of the type described in the application of Buckley Crist, Serial No. 313,315, filed October 6, 1952, now Patent No. 2,726,841, be used. Faucets of this type minimize foaming of carbonated beverages while permitting discharge of the beverage at reasonably rapid rates. Since the faucet controls the flow through the coil 19, the coil is constantly filled with the beverage.

In automatic coin-controlled dispensing machines, a meter or measuring cylinder 27 is inserted in the line 18 between the beverage tank 10 and the water bath vat 20. For more complete details of a typical coin-controlled pre-mix dispensing device in which the present invention is adapted for use, reference is made to the Buckley Crist application Serial No. 126,594, filed November 10, 1949, entitled "Beverage Dispensing Machine." This application discloses a suitable measuring cylinder in detail.

Cooling of the beverage is accomplished by means of a refrigerant coil 26 that is interposed with and wound adjacent to the beverage cooling coil 19 and disposed in the water bath vat 20. The turns of the two coils alternate so that the coils are adjacent each other throughout their lengths. Preferably the refrigerant flows into the refrigerant coil at the top of the coil making the flow of the refrigerant in coil 26 counter to the flow of the beverage in coil 19. As shown in Figure 2 the refrigerant coil is provided with radially extended fins 28 to give it extended surface area and improve the heat transfer between the refrigerant and the water bath. These fins may be formed in any convenient manner and are preferably either formed integrally with the tube 29 which carries the refrigerant or are bonded thereto as by soldering or brazing. Preferably the coils 19 and 26 are wound together, with the edges of the fins 28 engaging the interposed turns 30 of the beverage coil 19, and then the assembly is dipped in molten tin for the dual purpose of protecting the coils and improving the heat transfer paths between the fins 28 and the turns 30 of the beverage coil 19. The fins 28 thus provide extended heat exchange surface for the beverage coil as well as the refrigerant coil and provide metallic heat transfer paths between the two coils. It has been found that a good balance in heat transfer between the fins and the beverage coil is achieved by providing a fin surface about ten times the surface of the beverage coil. This is the relationship between the static coefficient of heat transfer of the fins in contact with the water bath and the coefficient of heat transfer of the moving liquid within the beverage coil.

Coils 19 and 26 are submerged in water in the vat 20. Accordingly, evaporation of the liquid refrigerant in the coil 26 will have the effect of cooling the beverage in the beverage coil 19 through heat transfer taking place through the fins 28 and also of cooling the water surrounding both coils. The refrigeration system is arranged to freeze the water in the vat into a solid block of ice but not to reduce the temperature of the beverage below its freezing point. In order to accomplish this a refrigeration system of generally conventional design is employed, a preferred form of the refrigeration system comprising a conventional compressor 32 and an air cooled condenser 33 from which the refrigerant liquid flows through conduit 34, heat exchanger 35, expansion valve 36 and conduit 37 to the refrigerant coil 26. Inasmuch as the temperature of the refrigerant must be accurately controlled, a sensitive expansion valve 36 is employed and in some installations it may be advantageous to include an evaporator regulating valve 38 in the return conduit 39. Conduit 39 leads to the heat exchanger 35 from which the gaseous refrigerant is then returned to compressor 32 by way of conduit 40. The evaporator regulating valve 38 prevents the pressure on the low side of the refrigeration system from falling below a point at which the temperature of the refrigerant would become so low that there would be danger of freezing the beverage in the coil 19. The coil 26 must be carefully constructed without irregularities or obstructions that would result in the production of cold spots in the coil. The components of the refrigeration system, aside from the refrigeration coil 26, may be of well known construction and per se form no part of the present invention.

In operation the refrigeration controls are adjusted so that in a system in which a well known drink of the cola type is being cooled, the refrigerant coil has a temperature of about 30° F. This is cool enough to freeze the water in the vat 20 into ice, yet is above the freezing temperature of the beverage. In operation the water in the vat 20 is frozen into a solid chunk of ice during periods of relatively low demand. During periods of high demand the beverage passing through the coil is cooled rapidly both by direct transfer of heat to the refrigerant through the heat transfer fins 28 and by the transfer of heat from the beverage to the melting ice surrounding the beverage coil. With a vat having a capacity of about 1⅞ gallons of water, the heat of fusion of the ice, in conjunction with the cooling provided by the operation of a ⅛ H. P. compressor, makes it possible to dispense one hundred 6-ounce drinks at average temperatures well below 40° F. in a period of twenty-five minutes, starting with a beverage in the tank 10 at a temperature of 80° F. During periods of low demand the compressor only runs infrequently after the water in the vat 20 has been frozen into ice and the drinks are dispensed at temperatures in the vicinity of the freezing temperature of water, a result that increases the refreshing qualities of the drinks and minimizes foaming difficulties.

Although the illustrated embodiment of the invention shows only one beverage storage tank and means for cooling the beverage from this tank, it is within the inventive concept to include other beverage storage tanks containing beverages of different flavors, in which case it is contemplated that the several beverage coils will be interposed with the refrigerant coil in a manner similar to that shown in Figure 1 but with modifications necessary to fit multiple cooling coils in the water bath vat 20. While the specific disclosure herein relates to dispensing a carbonated beverage and cooling in a water bath, it is to be understood that the invention may be utilized in the cooling and dispensing of other liquids, and that other baths may be employed so long as the freezing temperature of the liquid making up the bath is above that of the liquid to be cooled and below the temperature at which the liquid is to be dispensed.

It is to be understood that the form of this invention herewith shown and described is to be taken as a preferred example of the same and that various changes in the shape, size and arrangement of parts may be resorted to without departing from the invention or the scope of the subjoined claims.

I claim:
1. Apparatus for dispensing a beverage having a freezing point lower than the freezing point of water comprising means for supplying carbonated beverage under pressure, a vat containing water, a beverage cooling tube in the form of a coil immersed in the water in said vat with the exterior of the tube in direct contact with the water in said vat, said tube being connected at one end to said beverage supplying means and at the other end to a dispensing valve, refrigeration means including a compressor for a volatile refrigerant, an evaporator and fluid connections between said evaporator and said compressor, said evaporator comprising a tube in the form of a coil immersed in the water in said vat with the exterior of the tube in direct contact with the water in said vat and having the turns thereof concentric with, alternating with, and adjacent the turns of said beverage cooling tube, a plurality of fins extending transversely to the axes of the beverage cooling tube and the evaporator tube, said fins being directly in contact and in heat exchange relation with both said tubes and with the water in said vat, said fins providing metallic paths for the flow of heat between said tubes and between said tubes and the water in the vat, and an expansion valve in the connection leading from the compressor to the evaporator for controlling the evaporation of the refrigerant in said refrigerant tube to maintain the temperature of said tube above the freezing point of the beverage in the beverage tube.

2. Apparatus for dispensing a beverage having a freezing point lower than the freezing point of water comprising means for supplying carbonated beverage under pressure, a vat containing water, a beverage cooling tube in the form of a coil immersed in the water in said vat with the exterior the tube in direct contact with the water in said vat, said tube being connected at one end to said beverage supplying means and at the other end to a dispensing valve, refrigeration means including a compressor for a volatile refrigerant, an evaporator and fluid connections between said evaporator and said compressor, said evaporator comprising a tube in the form of a coil immersed in the water in said vat with the exterior of the tube in direct contact with the water in said vat and having the turns thereof concentric with, alternating with, and adjacent the turns of said beverage cooling tube, a plurality of fins extending transversely to the axes of the beverage cooling tube and the evaporator tube, said fins being directly in contact and in heat exchange relation with both said tubes and with the water in said vat, said fins providing metallic paths for the flow of heat between said tubes and between said tubes and the water in the vat, an expansion valve in the connection leading from the compressor to the evaporator and an evaporator regulating valve in the connection leading from the evaporator to the compressor for controlling the evaporation of the refrigerant in said refrigerant tube to maintain the temperature of said tube above the freezing point of the beverage in the beverage tube.

3. Apparatus for dispensing a carbonated beverage having a freezing point slightly lower than the freezing point of water comprising a vat containing water, a beverage cooling tube in the form of a coil immersed in the water in said vat with the exterior of the tube in direct contact with the water in said vat, means connected to one end of said beverage tube for supplying carbonated beverage under pressure thereto and valve means controlling discharge of beverage from the other end of said beverage tube, refrigeration means including a refrigerant tube constituting an evaporator for a volatile refrigerant and means for supplying volatile refrigerant to said refrigerant tube, said refrigerant tube being in the form of a coil immersed in the water in said vat with the exterior of the tube in direct contact with the water in said vat and having the turns thereof concentric with and adjacent to the turns of said beverage coil, a plurality of fins extending transversely to the axes of the beverage cooling tube and said refrigerant tube, each of said fins being directly in contact with and in heat exchange relation with both said tubes and with the water in said vat, said fins providing metallic paths for the flow of heat between said tubes and between said tubes and the water in the vat, and means for controlling the evaporation of refrigerant in said refrigerant tube to freeze the water in said vat without freezing the beverage in said beverage tube.

4. Apparatus for dispensing a beverage having a freezing point slightly lower than the freezing point of water comprising a vat containing water, a beverage cooling tube in the form of a coil immersed in the water in said vat with the exterior of the tube in direct contact with the water in said vat, means connected to one end of said beverage tube for supplying beverage thereto under pressure and valve means controlling discharge of beverage from the other end of said beverage tube, refrigeration means including a refrigerant tube constituting an evaporator for volatile refrigerant in the form of a coil immersed in the water in said vat with the exterior of the tube in direct contact with the water in said vat and having the turns thereof concentric with, alternating with and adjacent the turns of said beverage coil, a plurality of fins extending transversely to the axes of the beverage cooling tube and said refrigerant tube, said fins being directly in contact with and in heat exchange relation with both said tubes and with the water in said vat, the fins being separate from each other and providing extended surface area in contact with the water at least several times as great as the surface area of the beverage tube in contact with the beverage, said fins providing metallic paths for the flow of heat between said tubes and between said tubes and the water in the vat, and means for controlling the evaporation of refrigerant in said refrigerant tube to freeze the water in said vat without freezing the beverage in said beverage tube.

5. A method of cooling and dispensing a non-alcoholic carbonated beverage having a freezing temperature slightly below the freezing temperature of water, comprising the steps of providing a beverage coil and a refrigerant coil in heat exchange relation to a water bath and to each other, constantly maintaining said beverage coil full of beverage and intermittently passing the beverage through the beverage coil, freezing the water in said bath into ice by refrigerating said water bath by means of the evaporation of a volatile refrigerant in said refrigerant coil and transferring heat from the water to the refrigerant coil through extended surface area elements in contact with the water and the refrigerant coil, cooling said beverage in part by said water bath by transmission of heat from said beverage coil to said water bath through said extended surface area elements, and in part by transmission of heat from said beverage coil to said refrigerant coil independently of said water bath, and controlling the evaporation of said refrigerant in said refrigerant coil to prevent the temperature of said beverage coil from being reduced below the freezing temperature of said beverage.

6. The method according to claim 5 wherein the ratio between the total area of said extended surface elements and the surface area of the beverage coil is at least substantially as great as the ratio between the coefficient of heat transfer of the moving beverage within the beverage coil and the static coefficient of heat transfer of the extended surface in contact with the water bath.

7. Apparatus for dispensing a beverage having a freezing point lower than the freezing point of water comprising a beverage storage tank, a carbon dioxide tank connected to said storage tank, a vat containing water, a beverage cooling tube in the form of a coil immersed in the water in said vat with the exterior of the tube in direct contact with the water in said vat, said tube being connected at one end to said storage tank and at the other end to a dispensing valve, refrigeration means including a compressor for a volatile refrigerant, an evaporator and fluid connections between said evaporator and said compressor, said evaporator comprising a tube in the form of a coil immersed in the water in said vat with the exterior of the tube in direct contact with the water in said vat and having the turns thereof concentric with, alternating with, and adjacent the turns of said beverage coil, a plurality of fins extending transversely to the axes of the beverage cooling tube and the evaporator tube, said fins being directly in contact and in heat exchange relation with both said tubes and with the water in said vat, the fins engaging each turn of said evaporator tube being separate from the fins engaging adjacent turns thereof, said fins providing paths for the flow of heat between said tubes and between said tubes and the water in the vat, and an expansion valve in the connection leading from the compressor to the evaporator for controlling the evaporation of the evaporator in said refrigerant tube to maintain the temperature of said tube above the freezing point of the beverage in the beverage tube.

8. Apparatus for dispensing a beverage having a freezing point lower than the freezing point of water comprising a beverage storage tank, a carbon dioxide tank connected to said storage tank, a vat containing water, a beverage cooling tube in the form of a coil immersed in the water in said vat with the exterior of the tube in direct contact with the water in said vat, said tube being connected at one end to said storage tank and at the other end to a dispensing valve, refrigeration means including a compressor for a volatile refrigerant, an evaporator and fluid connections between said evaporator and said compressor, said evaporator comprising a tube in the form of a coil immersed in the water in said vat with the exterior of the evaporator tube in direct contact with the water in said vat and having the turns thereof adjacent the turns of said beverage coil, a plurality of fins extending transversely to the axes of the beverage cooling tube and the evaporator tube, said fins being directly in contact with and in heat exchange relation with both said tubes and with the water in said vat, said fins providing metallic paths for the flow of heat between said tubes and between said tubes and the water in the vat, and an expansion valve in the connection leading from the compressor to the evaporator for controlling the evaporation of the refrigerant in said evaporator tube to maintain the temperature of said tube above the freezing point of the beverage in the tube.

9. Apparatus for dispensing a beverage having a freezing point lower than the freezing point of water comprising a beverage storage tank, a carbon dioxide tank connected to said storage tank, a vat containing water, a beverage cooling tube immersed in the water in said vat with the exterior of the tube in direct contact with the water in said vat, said tube being connected at one end to said storage tank and at the other end to a dispensing valve, refrigeration means including a compressor for a volatile refrigerant, an evaporator and fluid connections between said evaporator and said compressor, said evaporator comprising a tube immersed in said water in said vat with the exterior of the tube in direct contact with the water in said vat and being adjacent the length of said beverage coil in said vat, a plurality of fins extending transversely to the axes of the beverage cooling tube and the evaporator tube, said fins being directly in contact with and in heat exchange relation with both said tubes and with the water in said vat, said fins being separate from each other and providing extended surface area in contact with the water at least several times as great as the surface area of the beverage tube in contact with the water and providing metallic paths for the flow of heat between said tubes and between said tubes and the water in the vat, and an expansion valve in the connection leading from the compressor to the evaporator for controlling the evaporation of the refrigerant in said evaporator tube to maintain the temperature of said tube above the freezing point of the beverage in the tube.

References Cited in the file of this patent

UNITED STATES PATENTS

| | | |
|---|---|---|
| 1,869,917 | Schmieding | Aug. 2, 1932 |
| 2,108,898 | Lyons | Feb. 22, 1938 |
| 2,126,687 | Martin | Aug. 9, 1938 |
| 2,129,778 | Middleton | Sept. 30, 1938 |
| 2,142,856 | Lieb | Jan. 3, 1939 |
| 2,146,058 | Doyle | Feb. 7, 1939 |
| 2,367,340 | Daun | Jan. 16, 1945 |
| 2,506,840 | Pigue | May 9, 1950 |